(12) United States Patent
Park et al.

(10) Patent No.: US 10,586,658 B2
(45) Date of Patent: Mar. 10, 2020

(54) PHOTOELECTROCHEMICAL ELECTRODE FOR CARBON DIOXIDE CONVERSION INCLUDING P-TYPE COPPER-IRON COMPOSITE OXIDE AND REUSABLE PHOTOELECTROCHEMICAL DEVICE INCLUDING THE SAME

(71) Applicant: Kyungpook National University Industry-Academic Cooperation Foundation, Daegu (KR)

(72) Inventors: Hyunwoong Park, Daegu (KR); Unseock Kang, Jeju-si (KR)

(73) Assignee: Kyungpook National University Industry-Academic Cooperation Foundation, Daegu (KR)

(*) Notice: Subject to any disclaimer, the term of this patent is extended or adjusted under 35 U.S.C. 154(b) by 353 days.

(21) Appl. No.: 15/348,674

(22) Filed: Nov. 10, 2016

(65) Prior Publication Data

US 2017/0243700 A1    Aug. 24, 2017

(30) Foreign Application Priority Data

Feb. 24, 2016  (KR) .................. 10-2016-0021646

(51) Int. Cl.
  *H01G 9/20*  (2006.01)
  *C25B 1/00*  (2006.01)
  *C25B 3/04*  (2006.01)
  *C25B 9/06*  (2006.01)
  *C25B 11/04* (2006.01)

(52) U.S. Cl.
  CPC ........... *H01G 9/2027* (2013.01); *C25B 1/003* (2013.01); *C25B 3/04* (2013.01); *C25B 9/06* (2013.01); *C25B 11/0405* (2013.01); *C25B 11/0415* (2013.01); *C25B 11/0452* (2013.01); *Y02E 10/542* (2013.01); *Y02P 20/135* (2015.11)

(58) Field of Classification Search
  CPC ... C25B 9/06; C25B 11/0405; C25B 11/0415; C25B 11/0452; C25B 1/003; C25B 3/04; Y02P 20/135; H01G 9/2027; Y02E 10/542
  See application file for complete search history.

(56) References Cited

U.S. PATENT DOCUMENTS

| | | | | |
|---|---|---|---|---|
| 2012/0267234 A1* | 10/2012 | Reece | ............. | B01J 19/127 204/157.5 |
| 2013/0199937 A1* | 8/2013 | Cole | ............. | C25B 3/04 205/351 |
| 2014/0261645 A1* | 9/2014 | Hoertz | ............. | C25B 11/035 136/254 |

* cited by examiner

*Primary Examiner* — Ciel P Thomas
(74) *Attorney, Agent, or Firm* — Novick, Kim & Lee, PLLC; Jae Youn Kim

(57) ABSTRACT

Provided is a photoelectrochemical electrode for carbon dioxide conversion. The photoelectrochemical electrode includes a conducting substrate and $CuFeO_2/CuO$ as a p-type copper-iron composite oxide electrodeposited on the conducting substrate. Upon irradiation, the photoelectrochemical electrode generates electrons and converts carbon dioxide to formate with a selectivity of 90 to 99%. Also disclosed is a photoelectrochemical device including the photoelectrochemical electrode.

14 Claims, 12 Drawing Sheets

PHOTOELECTROCHEMICAL ELECTRODE FOR CARBON DIOXIDE CONVERSION INCLUDING P-TYPE COPPER-IRON COMPOSITE OXIDE AND REUSABLE PHOTOELECTROCHEMICAL DEVICE INCLUDING THE SAME

CROSS-REFERENCE TO RELATED APPLICATIONS

The instant application claims priority under 35 USC § 119 to Korean patent application No. 10-2016-0021646, filed in the Korean Intellectual Property Office on Feb. 24, 2016, the entire content of which is hereby incorporated by reference.

BACKGROUND OF THE INVENTION

1. Field of the Invention

The present invention relates to a photoelectrochemical electrode for carbon dioxide conversion including a p-type copper-iron composite oxide and a photoelectrochemical device including the photoelectrochemical electrode.

2. Description of the Related Art

Solar $CO_2$ recycling has received wide attention primarily to address global $CO_2$ emission and to convert $CO_2$ and water to value-added chemicals. Despite a long research history over the past four decades, the technology remains in an early stage, with low $CO_2$ conversion efficiency and selectivity. $CO_2$ is highly stable and has limited solubility in water, and its reduction requires multiple proton-coupled electron transfers, resulting in a range of carbon intermediates (C1-C3) as well as a larger amount of $H_2$ over $CO_2$ conversion products.

For the realization of solar $CO_2$ recycling, the system of interest should be operated sustainably, which requires the development of not only energy-efficient and cost-effective materials but also stand-alone, complete reaction processes ($CO_2$ reduction and water oxidation) operating for long periods without any external bias. A range of semiconductors (mostly p-types) have been studied for $CO_2$ conversion, including GaP, InP, GaAs, Si, $Cu_2O$, and $CuFeO_2$, all of which have narrow bandgaps ($E_g$) and sufficient Fermi levels ($E_F$) capable of reducing $CO_2$. Although promising, these materials inherently require potential biases to drive the $CO_2$ reduction reaction and compete with other metallic electrodes, whereas complete reactions ($CO_2$ reduction and water oxidation) have been rarely demonstrated due to large overpotentials. Photocathode-photoanode couples have been demonstrated to operate, yet the syntheses of materials are complicated and the energy conversion efficiency is low.

Solar conversion of carbon dioxide and water to value-added chemicals remains a challenge. A number of solar-active catalysts have been reported, but they still suffer from low selectivity, poor energy efficiency, and instability, and fail to drive simultaneous water oxidation.

SUMMARY OF THE INVENTION

In attempts to solve the above problems, the present inventors have fabricated $CuFeO_2$ and CuO mixed p-type catalysts via widely employed electroplating of earth-abundant cupric and ferric ions followed by sintering under atmospheric air and have applied the p-type catalysts as solar-active catalysts, achieving the present invention.

It is, therefore, one object of the present invention to provide a photoelectrochemical electrode including $CuFeO_2$/CuO as a p-type copper-iron composite oxide.

It is a further object of the present invention to provide a reusable photoelectrochemical device for carbon dioxide conversion including the photoelectrochemical electrode.

According to one aspect of the present invention, there is provided a photoelectrochemical electrode including a conducting substrate and $CuFeO_2$/CuO as a copper-iron composite oxide electrodeposited on the conducting substrate wherein upon irradiation, the photoelectrochemical electrode generates electrons and converts carbon dioxide to formate with a selectivity of 90 to 99%.

According to a further aspect of the present invention, there is provided a highly durable photoelectrochemical device for carbon dioxide conversion including the photoelectrochemical electrode, a counter electrode, an electrolyte solution, and a housing adapted to accommodate the photoelectrochemical electrode, the counter electrode, and the electrolyte solution wherein the photoelectrochemical electrode is electrically connected to the counter electrode.

The p-type copper-iron composite oxide $CuFeO_2$/CuO is simple to fabricate from inexpensive raw materials. Due to this advantage, the p-type copper-iron composite oxide can be fabricated on a large scale.

The presence of the p-type copper-iron composite oxide $CuFeO_2$/CuO allows the photoelectrochemical electrode of the present invention to convert carbon dioxide to formate with a selectivity of 90 to 99%. The carbon dioxide-to-formate conversion efficiency is from 1 to 1.5%, which is higher than that reported previously.

In addition, the photoelectrochemical device of the present invention is highly stable, enabling continuous conversion of carbon dioxide to formate for a long time. The photoelectrochemical device of the present invention is reusable at least 10 times consecutively and maintains its high performance for at least consecutive 35 days.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
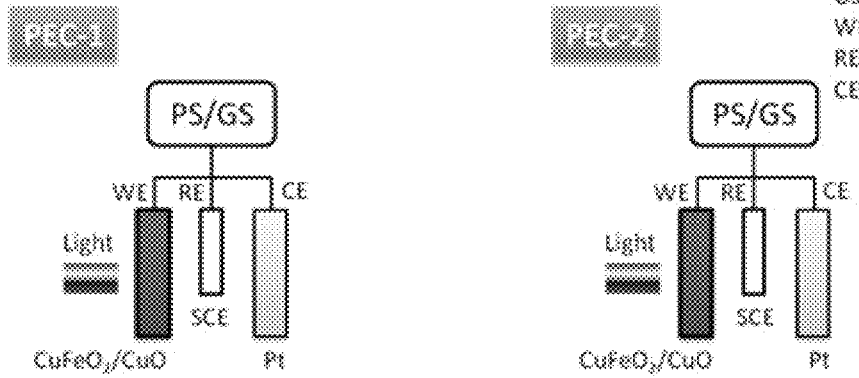
FIG. 1 illustrates schematic diagrams of photoelectrochemical devices for carbon dioxide conversion fabricated in Examples 1-4.
Figure 1:
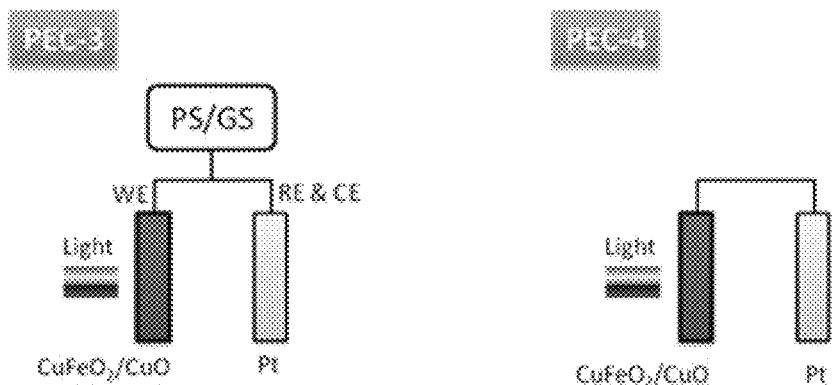

The present invention will now be described in detail.

The present invention is directed to a photoelectrochemical electrode including a p-type copper-iron composite oxide and a photoelectrochemical device including the photoelectrochemical electrode.

Specifically, one aspect of the present invention is directed to a photoelectrochemical electrode including a conducting substrate and $CuFeO_2/CuO$ as a copper-iron composite oxide electrodeposited on the conducting substrate wherein upon irradiation, the photoelectrochemical electrode generates electrons and converts carbon dioxide to formate with a selectivity of 90 to 99%.

The conducting substrate may be a glass or plastic substrate containing a material selected from the group consisting of polypropylene (PP), polyimide (PI), polyethylene terephthalate (PET), polyethylene naphthalate (PEN), polycarbonate (PC), triacetyl cellulose (TAC), indium tin oxide (ITO), fluorine tin oxide (FTO), antimony tin oxide (ATO), zinc oxide (ZnO), tin oxide ($SnO_2$), ZnO—$Ga_2O_3$, ZnO—$Al_2O_3$, $SnO_2$—$Sb_2O_3$, Ti, Pt, Au, Ag, Ni, and combinations thereof. A glass substrate containing fluorine tin oxide is preferably used.

The conversion efficiency of carbon dioxide to formate is from 0.7 to 1.5% and the selectivity for formate is 90 to 99%. Due to this high selectivity, the copper-iron composite oxide can convert the particular substance only.

The photoelectrochemical electrode is fabricated by electrodeposition of the p-type copper-iron composite oxide $CuFeO_2/CuO$ for 30 minutes to 2 hours, preferably 2 hours, to form a film and sintering the film under atmospheric air including nitrogen or argon at 620 to 720° C. for 1 to 3 hours, preferably at 650° C. 3 hours. In the Examples section that follows, copper-iron composite oxides were fabricated from $Cu(NO_3)_2.3H_2O$ and $Fe(ClO_4)_3.H_2O$ at different concentration ratios of 1:0.75, 1:1.5, 1:2.25, 1:3, 1:6, 1:12, 1:24, and 1:32. A preferred concentration ratio of $Cu(NO_3)_2.3H_2O$ and $Fe(ClO_4)_3.H_2O$ was found to be 4:12.

The photoelectrochemical electrode can be reused by annealing. Preferably, a device including the photoelectrochemical electrode can be reused at least 10 times consecutively, preferably at least 5 times consecutively.

A further aspect of the present invention is directed to a photoelectrochemical device for carbon dioxide conversion including the photoelectrochemical electrode, a counter electrode, an electrolyte solution, and a housing adapted to accommodate the photoelectrochemical electrode, the counter electrode, and the electrolyte solution wherein the photoelectrochemical electrode is electrically connected to the counter electrode.

The electrolyte may be a sodium bicarbonate or potassium bicarbonate solution purged with a gas selected from nitrogen, carbon dioxide, and oxygen.

In the Examples section that follows, oxygen purging slightly increased cathodic photocurrent generation compared to nitrogen purging due to a faster interfacial electron transfer to oxygen compared to water reduction with nitrogen purging. When carbon dioxide was purged, the photocurrent generation was further enhanced and the onset potential ($E_{on}$) was slightly shifted anodically, which suggests that the photoelectrochemical electrode could be effective for not only oxygen reduction but also carbon dioxide reduction.

The photoelectrochemical device of the present invention can be reused by annealing. This reusability indicates improved durability of the photoelectrochemical device. The photoelectrochemical device is reusable at least 10 times consecutively and has a lifetime of at least consecutive 35 days, demonstrating its improved durability with long lifetime.

The present invention will be explained in more detail with reference to the following examples and the accompanying drawings. It will be obvious to those skilled in the art that these examples are provided for illustrative purposes only and are not intended to limit the scope of the invention.

EXAMPLES

Electrodes including copper-iron composite oxides and photoelectrochemical devices for carbon dioxide conversion including the electrodes were fabricated by the following procedures.

Fabrication of $CuFeO_2$ Electrode

A fluorine-doped $SnO_2$ ($F:SnO_2$, FTO)-coated glass substrate (Pilkington, ~50-nm-thick FTO layer, 1.5 cm×3 cm) was cleaned ultrasonically in ethanol for 10 min, rinsed with distilled water, and dried. The FTO substrate (active areas exposed to solution: 0.5 cm×0.5 cm) was maintained at −0.36 V vs. SCE (saturated calomel electrode) for 2 h in aqueous $KClO_4$ (50 mM, Aldrich) solution with $Cu(NO_3)_2.3H_2O$ (4 mM, Aldrich) and $Fe(ClO_4)_3.H_2O$ (12 mM, Aldrich) using a potentiostat/galvanostat (Ivium). Platinum gauze was used as a counter electrode. After drying in air, the as-deposited film was sintered at 650° C. for 3 h in argon to fabricate a $CuFeO_2$ electrode.

Fabrication of $CuFeO_2/CuO$ Electrode

A fluorine-doped $SnO_2$ ($F:SnO_2$, FTO)-coated glass substrate (Pilkington, ~50-nm-thick FTO layer, 1.5 cm×3 cm) was cleaned ultrasonically in ethanol for 10 min, rinsed with distilled water, and dried. The FTO substrate (active areas exposed to solution: 0.5 cm×0.5 cm) was maintained at −0.36 V vs. SCE (saturated calomel electrode) for 2 h in aqueous $KClO_4$ (50 mM, Aldrich) solution with $Cu(NO_3)_2.3H_2O$ (4 mM, Aldrich) and $Fe(ClO_4)_3.H_2O$ (12 mM, Aldrich) using a potentiostat/galvanostat (Ivium). Platinum gauze was used as a counter electrode. After drying in air, the as-deposited film was sintered at 650° C. for 3 h in air to fabricate a $CuFeO_2/CuO$ electrode.

Figure 4A:
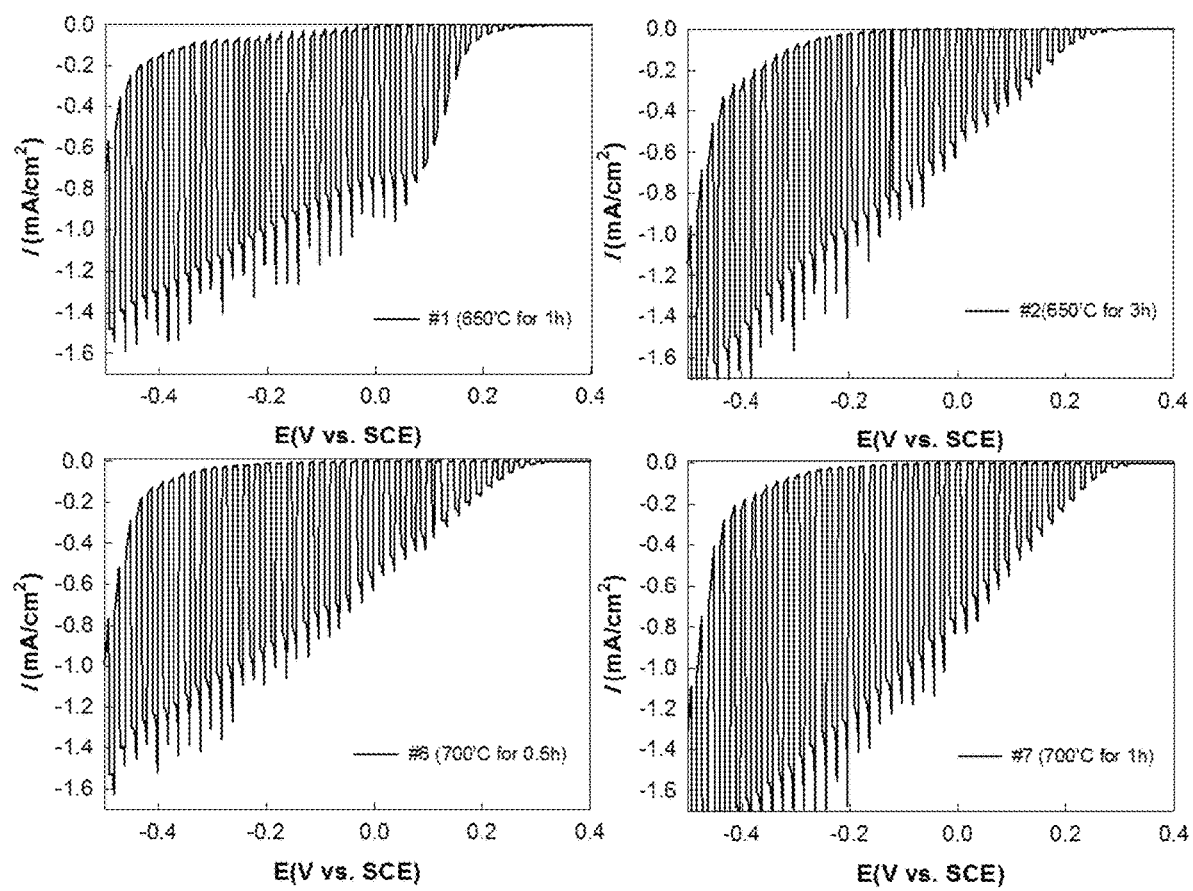
FIGS. 4A and 4B show the results of photocurrent tests for photoelectrochemical devices including $CuFeO_2$/CuO electrodes.
Figure 4B:
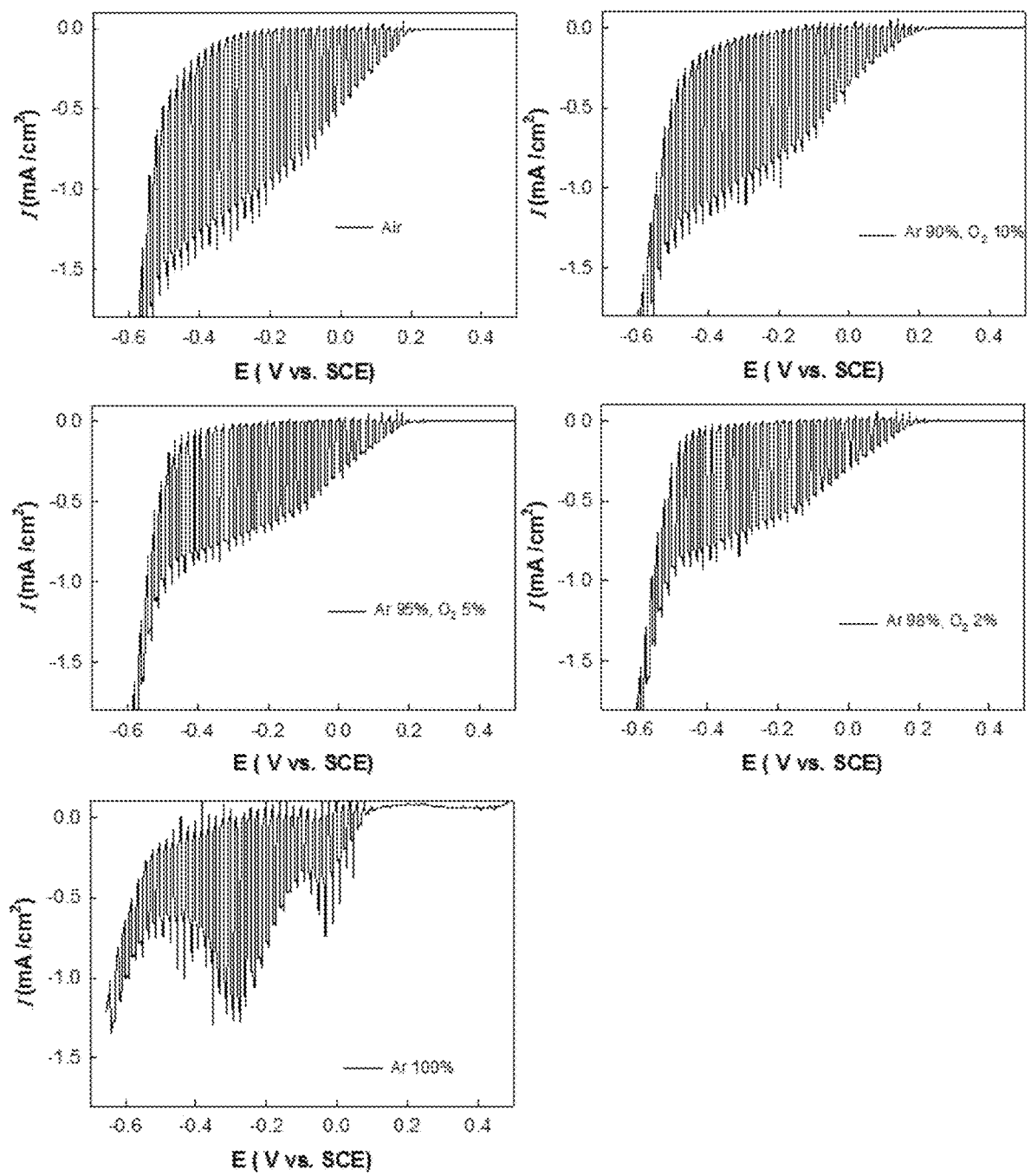
Figure 5:
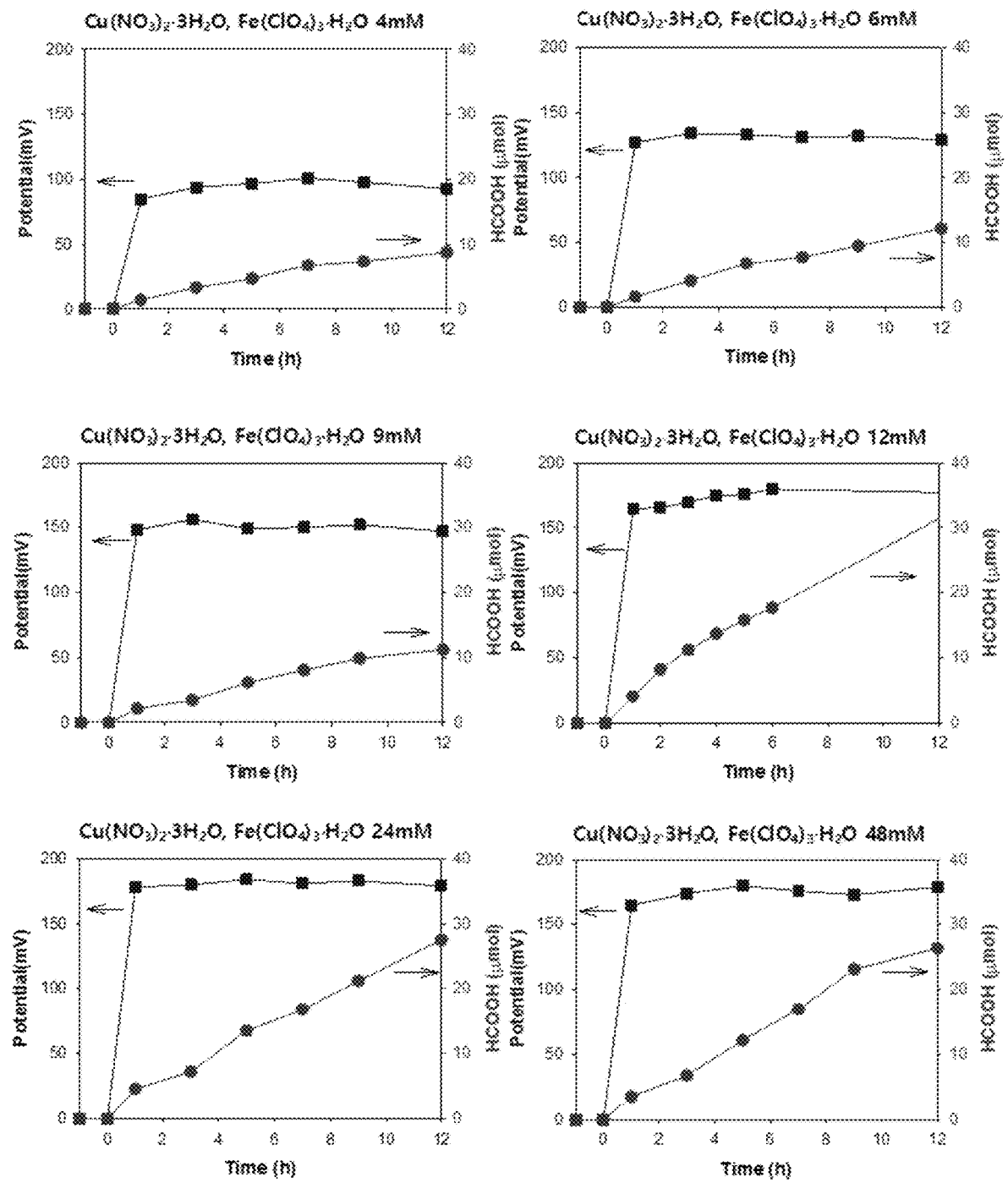
FIG. 5 shows the amounts of formate produced in photoelectrochemical devices including $CuFeO_2$/CuO electrodes.

The fabrication of the $CuFeO_2/CuO$ electrode is the most preferred method. $CuFeO_2/CuO$ electrodes were fabricated in the same manner as in the most preferred method, except that the concentration ratio of $Cu(NO_3)_2.3H_2O$ and $Fe(ClO_4)_3.H_2O$ was changed to 1:0.75, 1:1.5, 1:2.25, 1:3, 1:6, 1:12, 1:24, and 1:32, electrodeposition was performed for 30 min to 2 h, and sintering was performed at a temperature of 620-720° C. for 1-3 hr under a nitrogen, argon or general air atmosphere. FIGS. 4A, 4B, and 5 show the photocurrents of photoelectrochemical devices including the $CuFeO_2/CuO$ electrodes fabricated under the different conditions and the amounts of formate produced in the photoelectrochemical devices. Specifically, FIG. 4A shows changes in photocurrent depending on the sintering temperature and time and FIG. 4B shows changes in photocurrent depending on the sintering gas atmosphere. FIG. 5 shows changes in formate production depending on the concentration ratio of $Cu(NO_3)_2 \cdot 3H_2O$ and $Fe(ClO_4)_3 \cdot H_2O$. In FIG. 4A, tests were repeated under the respective temperature and time conditions to confirm the reproducibility of photocurrents. The electrodes fabricated by sintering at 650° C. for 3 h were found to be most stable.

Referring to FIG. 4B, higher photocurrents were observed when sintered in air than when sintered in argon (90-100%). Referring to FIG. 5, when $CuFeO_2/CuO$ films were fabricated by electrodeposition with $Cu(NO_3)_2 \cdot 3H_2O$ at a fixed concentration of 4 mM and $Fe(ClO_4)_3 \cdot H_2O$ at concentrations of 3-48 mM, different formate production rates were obtained. The formate production rate increased with increasing amount of $Fe(ClO_4)_3 \cdot H_2O$. The formate production rate was highest when $Fe(ClO_4)_3 \cdot H_2O$ was added at a concentration of 12 mM, and thereafter, began to decrease with increasing $Fe(ClO_4)_3 \cdot H_2O$ concentration above 12 mM.

From these results, it could be concluded that the largest amount of formate and the highest photocurrent were obtained in the $CuFeO_2/CuO$ electrode fabricated by adding 4 mM $Cu(NO_3)_2 \cdot 3H_2O$ and 12 mM $Fe(ClO_4)_3 \cdot H_2O$ to form an electrodeposited film and sintering the film at 650° C. for 3 h under air atmosphere.

Fabrication of $Cu_2O$ Electrode

A fluorine-doped $SnO_2$ ($F:SnO_2$, FTO)-coated glass substrate (Pilkington, ~50-nm-thick FTO layer, 1.5 cm×3 cm) was cleaned ultrasonically in ethanol for 10 min, rinsed with distilled water, and dried. The FTO substrate (active areas exposed to solution: 0.5 cm×0.5 cm) was maintained at −0.36 V vs. SCE (saturated calomel electrode) for 2 h in aqueous $KClO_4$ (50 mM, Aldrich) solution with $Cu(NO_3)_2 \cdot 3H_2O$ (4 mM, Aldrich) using a potentiostat/galvanostat (Ivium). Platinum gauze was used as a counter electrode. After drying in air, the as-deposited film was sintered at 650° C. for 3 h in argon to fabricate a $Cu_2O$ electrode.

Fabrication of CuO Electrode

A fluorine-doped $SnO_2$ ($F:SnO_2$, FTO)-coated glass substrate (Pilkington, ~50-nm-thick FTO layer, 1.5 cm×3 cm) was cleaned ultrasonically in ethanol for 10 min, rinsed with distilled water, and dried. The FTO substrate (active areas exposed to solution: 0.5 cm×0.5 cm) was maintained at −0.36 V vs. SCE (saturated calomel electrode) for 2 h in aqueous $KClO_4$ (50 mM, Aldrich) solution with $Cu(NO_3)_2 \cdot 3H_2O$ (4 mM, Aldrich) using a potentiostat/galvanostat (Ivium). Platinum gauze was used as a counter electrode. After drying in air, the as-deposited film was sintered at 650° C. for 3 h in air to fabricate a CuO electrode.

Example 1

Photoelectrochemical-1 (PEC-1)

Photoelectrochemical devices for carbon dioxide conversion were fabricated in which a 3-electrode configuration is connected to a potentiostat/galvanostat (PS/GS), as shown in (a) of FIG. 1. The devices apply constant voltages or potentials.

The structures of the devices are shown in Examples 1-1 to 1-4.

Example 1-1

A potentiostat/galvanostat (PS/GS) was connected to a 3-electrode configuration consisting of a working electrode (WE), a reference electrode (RE), and a counter electrode (CE). The working electrode was electrodeposited with $CuFeO2$. This device applies constant voltages or potentials.

Example 1-2

A potentiostat/galvanostat (PS/GS) is connected to a 3-electrode configuration consisting of a working electrode (WE), a reference electrode (RE), and a counter electrode (CE). The working electrode is electrodeposited with $CuFeO_2/CuO$. This device applies constant voltages or potentials.

Example 1-3

A potentiostat/galvanostat (PS/GS) is connected to a 3-electrode configuration consisting of a working electrode (WE), a reference electrode (RE), and a counter electrode (CE). The working electrode is electrodeposited with $Cu_2O$. This device applies constant voltages or potentials.

Example 1-4

A potentiostat/galvanostat (PS/GS) is connected to a 3-electrode configuration consisting of a working electrode (WE), a reference electrode (RE), and a counter electrode (CE). The working electrode is electrodeposited with CuO. This device applies constant voltages or potentials.

Example 2

Photoelectrochemical-2 (PEC-2)

Photoelectrochemical devices for carbon dioxide conversion were fabricated in which a 3-electrode configuration is connected to a potentiostat/galvanostat (PS/GS), as shown in (b) of FIG. 1. The devices do not apply constant voltages or potentials.

The structures of the devices are shown in Examples 2-1 to 2-4.

Example 2-1

A potentiostat/galvanostat (PS/GS) is connected to a 3-electrode configuration consisting of a working electrode (WE), a reference electrode (RE), and a counter electrode (CE). The working electrode is electrodeposited with $CuFeO_2$. This device does not apply constant voltages or potentials.

Example 2-2

A potentiostat/galvanostat (PS/GS) is connected to a 3-electrode configuration consisting of a working electrode (WE), a reference electrode (RE), and a counter electrode (CE). The working electrode is electrodeposited with $CuFeO_2/CuO$. This device does not apply constant voltages or potentials.

Example 2-3

A potentiostat/galvanostat (PS/GS) is connected to a 3-electrode configuration consisting of a working electrode (WE), a reference electrode (RE), and a counter electrode (CE). The working electrode is electrodeposited with $Cu_2O$. This device does not apply constant voltages or potentials.

Example 2-4

A potentiostat/galvanostat (PS/GS) is connected to a 3-electrode configuration consisting of a working electrode (WE), a reference electrode (RE), and a counter electrode (CE). The working electrode is electrodeposited with CuO. This device does not apply constant voltages or potentials.

Example 3

Photoelectrochemical-3 (PEC-3)

Photoelectrochemical devices for carbon dioxide conversion were fabricated in which a 2-electrode configuration is connected to a potentiostat/galvanostat (PS/GS), as shown in (c) of FIG. 1. The devices do not apply constant voltages or potentials.

The structures of the devices are shown in Examples 3-1 to 3-4.

Example 3-1

A potentiostat/galvanostat (PS/GS) is connected to a 2-electrode configuration consisting of a working electrode (WE) and a combination of a reference electrode and a counter electrode (RE&CE). The working electrode is electrodeposited with $CuFeO_2$. This device does not apply constant voltages or potentials.

Example 3-2

A potentiostat/galvanostat (PS/GS) is connected to a 2-electrode configuration consisting of a working electrode (WE) and a combination of a reference electrode and a counter electrode (RE&CE). The working electrode is electrodeposited with $CuFeO_2$/CuO. This device does not apply constant voltages or potentials.

Example 3-3

A potentiostat/galvanostat (PS/GS) is connected to a 2-electrode configuration consisting of a working electrode (WE) and a combination of a reference electrode and a counter electrode (RE&CE). The working electrode is electrodeposited with $Cu_2O$. This device does not apply constant voltages or potentials.

Example 3-4

A potentiostat/galvanostat (PS/GS) is connected to a 2-electrode configuration consisting of a working electrode (WE) and a combination of a reference electrode and a counter electrode (RE&CE). The working electrode is electrodeposited with CuO. This device does not apply constant voltages or potentials.

Example 4

Photoelectrochemical-4 (PEC-4)

Photoelectrochemical devices for carbon dioxide conversion were fabricated in which two electrodes are connected to each other, as shown in (d) of FIG. 1. The devices do not apply constant voltages or potentials.

The structures of the devices are shown in Examples 4-1 to 4-4.

Example 4-1

A cathode is connected to an anode in a 2-electrode configuration. The cathode is electrodeposited with $CuFeO_2$. This device does not apply constant voltages or potentials.

Example 4-2

A cathode is connected to an anode in a 2-electrode configuration. The cathode is electrodeposited with $CuFeO_2$/CuO. This device does not apply constant voltages or potentials.

Example 4-3

A cathode is connected to an anode in a 2-electrode configuration. The cathode is electrodeposited with $Cu_2O$. This device does not apply constant voltages or potentials.

Example 4-4

A cathode is connected to an anode in a 2-electrode configuration. The cathode is electrodeposited with CuO. This device does not apply constant voltages or potentials.

The performance of the fabricated electrodes and devices was evaluated and the results are explained below with reference to the accompanying drawings.

1. XRD, XPS, SEM and TEM

Figure 2:
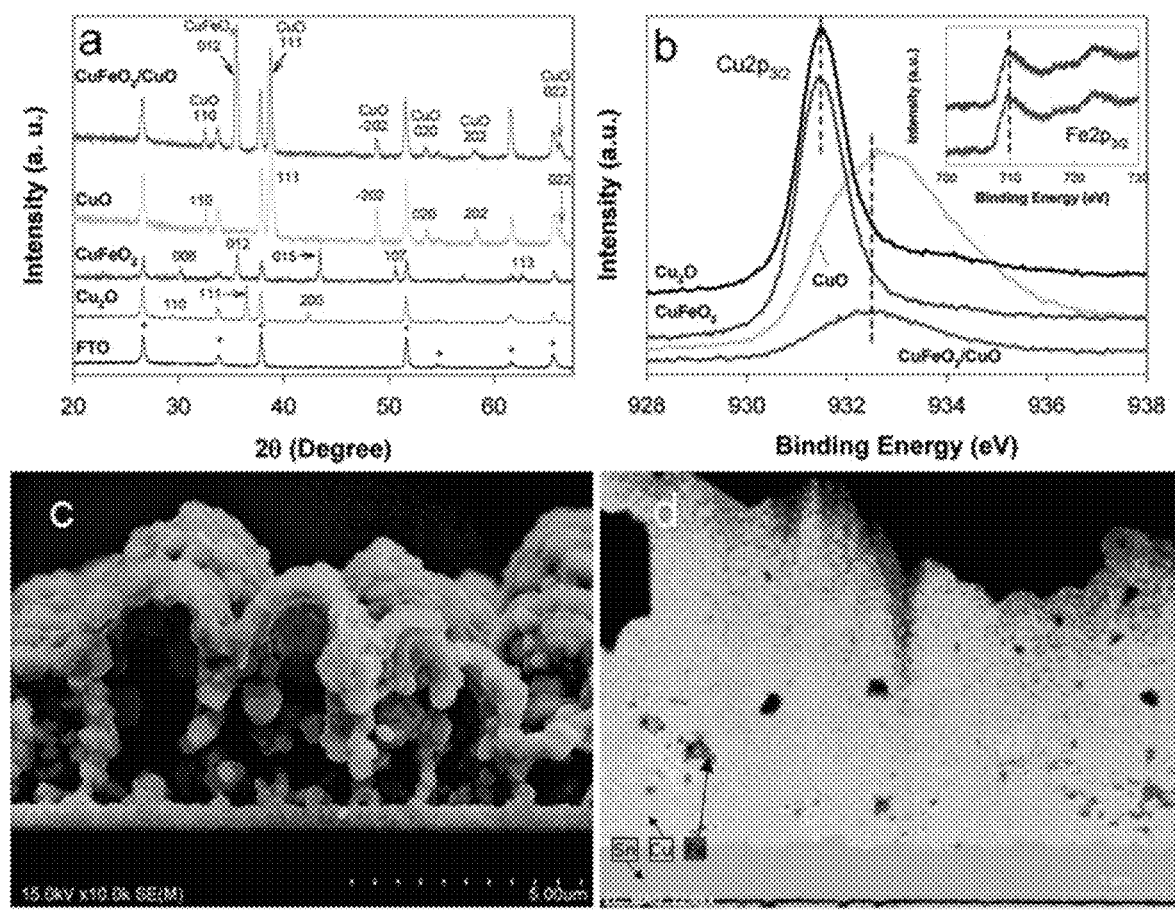
FIG. 2 shows XRD and XPS results of $CuFeO_2$/CuO, $Cu_2O$, CuO, and $CuFeO_2$, and SEM and TEM images of $CuFeO_2$/CuO.

FIG. 2 shows XRD and XPS results of $CuFeO_2$/CuO, $Cu_2O$, CuO, and $CuFeO_2$ and SEM and TEM images of $CuFeO_2$/CuO.

Specifically, (a) of FIG. 2 shows the XRD patterns of $CuFeO_2$/CuO, $Cu_2O$, CuO, and $CuFeO_2$ that were obtained via electrodeposition on conducting glass electrodes (FTO) at −0.36 VSCE for 2 h and calcination at 650° C. for 3 h under air or Ar atmosphere. In the presence of aqueous cupric ions ($Cu^{2+}$) alone in the plating solution, electrodeposition followed by calcination under air and argon atmospheres produced CuO and $Cu_2O$, respectively. In the presence of both cupric ions and ferric ions ($Fe^{3+}$), copper and iron were co-electrodeposited and transformed into pure $CuFeO_2$ and $CuFeO_2$/CuO composite oxides when annealed under Ar and air atmospheres, respectively. With the $CuFeO_2$/CuO composite sample, XRD phases originated from CuO and phases originated from $CuFeO_2$ (012 and 014) were observed. No peaks related to other oxides ($CuFeO_{2+\delta}$, $CuFe_2O_4$, or $Fe_3O_4$) were observed, which indicates that calcination in the presence of atmospheric air segregates Fe species and oxidizes Cu(I) to Cu(II). (b) of FIG. 2 shows the results of XPS analysis for $CuFeO_2$/CuO, $Cu_2O$, CuO, and $CuFeO_2$. The XPS analysis showed that the $Cu2p_{3/2}$ bands of the samples annealed under an Ar atmosphere have the same binding energy at 931.4 eV, coinciding with Cu(I) and supporting the formation of $Cu_2O$ and $CuFeO_2$. With the samples obtained under air atmospheres, the $Cu2p_{3/2}$ bands shifted to a high binding energy (932.6-932.7 eV) due to the oxidation of Cu(I) to Cu(II). In addition, the copper binding energy of $CuFeO_2$/CuO was −0.2 eV lower than that of CuO, indicating that Cu(I) and Cu(II) coexist in the mixed phase while the latter is more abundant. The $Fe2p_{3/2}$ bands of $CuFeO2$ and $CuFeO_2$/CuO samples displayed the same binding energy at 710.5 eV, which were assigned to Fe(III). Characterization via XRD and XPS, therefore, verifies that the simultaneous electrodeposition of Cu(II) and Fe(III) and subsequent oxidative annealing create CuO and $CuFeO_2$ bicrystallines preferentially.

(c) of FIG. 2 is a FE-SEM image of CuFeO$_2$/CuO. The CuFeO$_2$/CuO electrode had a 500 nm-thick underlayer and a 4-5nm-thick hollow overlayer. (d) of FIG. 2 is a TEM image of CuFeO$_2$/CuO. TEM/EDX elemental mapping of the cross-section of CuFeO$_2$/CuO showed the distribution of elemental Fe within a thickness of ~1.5 mm from the bottom. However, elemental mapping of the top of CuFeO$_2$/CuO showed the co-presence of Cu and Fe in an atomic ratio of 1.4. The above results confirm that CuFeO$_2$/CuO has a double-layered structure in which the Fe/Cu composite CuFeO$_2$ is present in the bottom regions and CuO containing only Cu is present in the top regions.

2. Photocurrent (Photoelectrochemical Response)

FIGS. 3A-3E show the results of photocurrent tests for the CuFeO$_2$/CuO, Cu$_2$O, CuO, and CuFeO$_2$ electrodes.

Figure 3A:
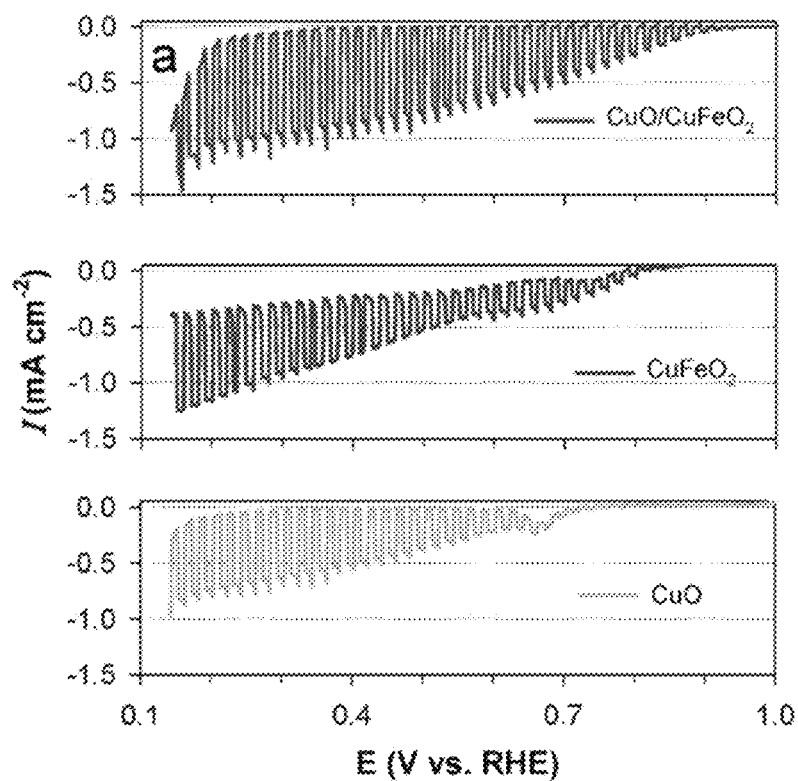
FIGS. 3A-3E show the results of photocurrent tests for $CuFeO_2$/CuO, $Cu_2O$, CuO, and $CuFeO_2$ electrodes and devices fabricated in Examples 1-2, 2-1 to 2-4, 3-2, and 4-2.

FIG. 3A shows the photocurrents of the CuFeO$_2$/CuO, CuFeO$_2$, and CuO electrodes. The CuFeO$_2$/CuO electrode showed the highest photocurrents due to its double-layered structure. The CuFeO$_2$ and CuO electrodes having monolayer structures generated smaller amounts of current because of short migration paths through which electrons recombine with holes. In contrast, for CuFeO$_2$/CuO having a double-layered structure, generated electrons migrate through the additional layer, which prevents the electrons from recombining with holes and allows a larger number of the electrons to migrate to areas where the electrode meets the solution than for the monolayer electrodes.

The photoelectrochemical responses of the as-prepared CuFeO$_2$/CuO electrodes were examined in 0.1 M bicarbonate solution purged with different gases (N$_2$, CO$_2$, and O$_2$). With N$_2$-purging, the electrodes generated cathodic photocurrents of +0.86 V$_{RHE}$, whereas O$_2$-purging slightly increased cathodic photocurrent generation due to a faster interfacial electron transfer to O$_2$ compared to water reduction with N$_2$-purging. When CO$_2$ was purged, the photocurrent generation was further enhanced, and the onset potential (E$_{on}$) was anodically shifted to +0.95 V$_{RHE}$, which suggests that the CuFeO$_2$/CuO photoelectrode could be effective for not only O$_2$ reduction but also CO$_2$ reduction. For comparison, CuO, Cu$_2$O, and CuFeO$_2$ electrodes were also tested in CO$_2$-purged bicarbonate solution. CuO exhibited E$_{on}$ of +0.73 V$_{RHE}$ and an insignificant dark current generation even at +0.3 V$_{RHE}$. However, CuO showed a cathodic peak at +0.65 V$_{RHE}$ due to Cu$^{2+}$ reduction. CuFeO$_2$ and Cu$_2$O showed large dark current generation and unstable photoresponses. Accordingly, CuFeO$_2$/CuO was found to be the most suitable candidate in terms of E$_{on}$, magnitude of photocurrent generation, and photoelectrochemical stability.

Figure 3B:
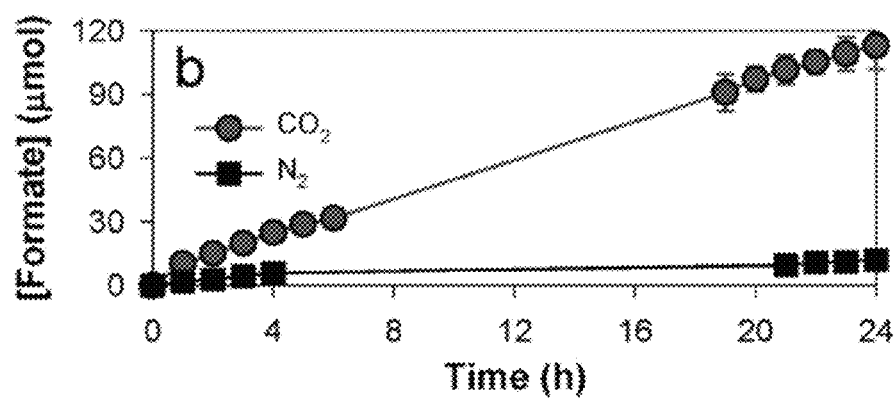

FIG. 3B shows the amounts of formate produced in the photoelectrochemical device of Example 1-2. The performance of the photoelectrochemical device was tested in a CO$_2$-purged 0.1 M bicarbonate electrolyte under irradiation of simulated solar light (AM 1.5G; 100 mW·cm$^2$) generated from a 150-W xenon arc lamp (ABET technology). Upon irradiation at a potential bias (E$_{bias}$)=+0.15 V$_{RHE}$ (PEC-1), formate was produced at ~5 µmol h$^{-1}$ in the bicarbonate salt continuously purged with CO$_2$. With N$_2$-purging, the formate production significantly decreased to 1 µmol h$^{-1}$ due to the reduction of bicarbonate to formate. These results can conclude that the inventive photoelectrochemical device is optimized for CO$_2$ conversion. During the course of the formate production in Example 1-2, other carbon compounds (CO, HCOH, CH$_3$OH, and C1-C4 hydrocarbons) were not detected or, even if produced, below detection limits. The device of Example 1-2 could produce formate even at +0.35 V$_{RHE}$ at 2.5 µmol h$^{-1}$.

Figure 3C:
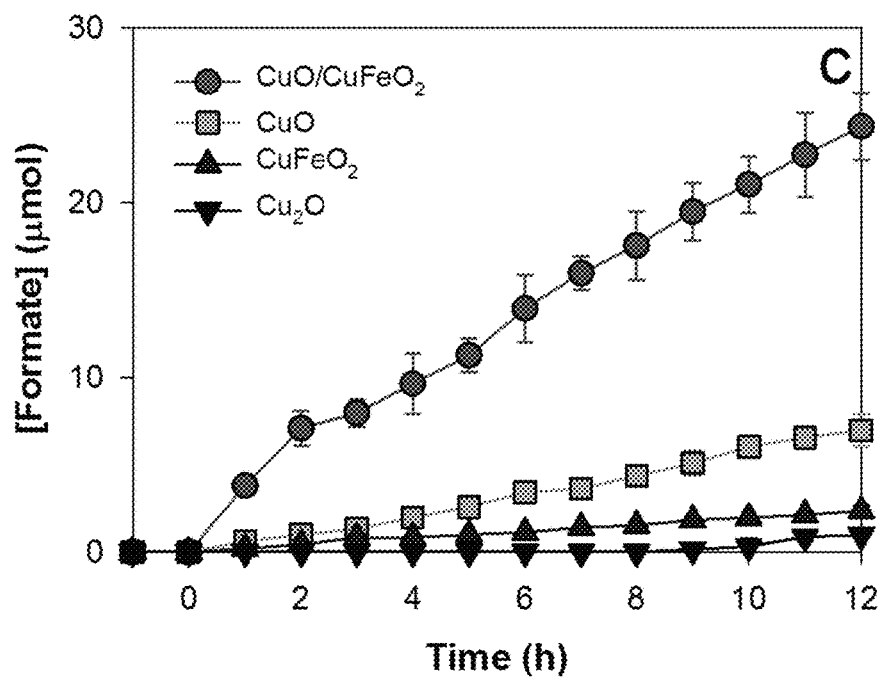

FIG. 3C shows the amounts of formate produced in the photoelectrochemical devices of Examples 2-1 to 2-4. Most importantly, the inventive photoelectrochemical device was found to operate to produce formate even in the absence of externally applied voltages or currents. Upon irradiation, formate was continuously produced at 2 µmol h$^{-1}$ for over 12 h in the open-circuit potential (E$_{ocp}$) mode. Simultaneously, E$_{ocp}$ was increased from +0.55 to +0.8-0.83 V$_{RHE}$, which was ~150 mV less than that of the E$_{on}$ value due to charge recombination. The devices including the CuO, Cu$_2$O, and CuFeO$_2$ electrodes were also found to operate under the same conditions, yet formate production rates were much lower than that of the device including the CuFeO$_2$/CuO electrode. In CuO, CuFeO$_2$, and Cu$_2$O having monolayer structures, a number of electrons do not migrate to the electrode surface because of short migration paths through which electrons recombine with holes. In contrast, for CuFeO$_2$/CuO having a double-layered structure, generated electrons migrate through the additional layer, which prevents the electrons from recombining with holes and allows a larger number of the electrons to migrate to areas where the electrode meets the solution than for the monolayer electrodes, leading to an increase in formate production via CO$_2$ conversion. These results indicate that the device including the CuFeO$_2$/CuO electrode having a double-layered structure produces the largest amount of formate.

Figure 3D:
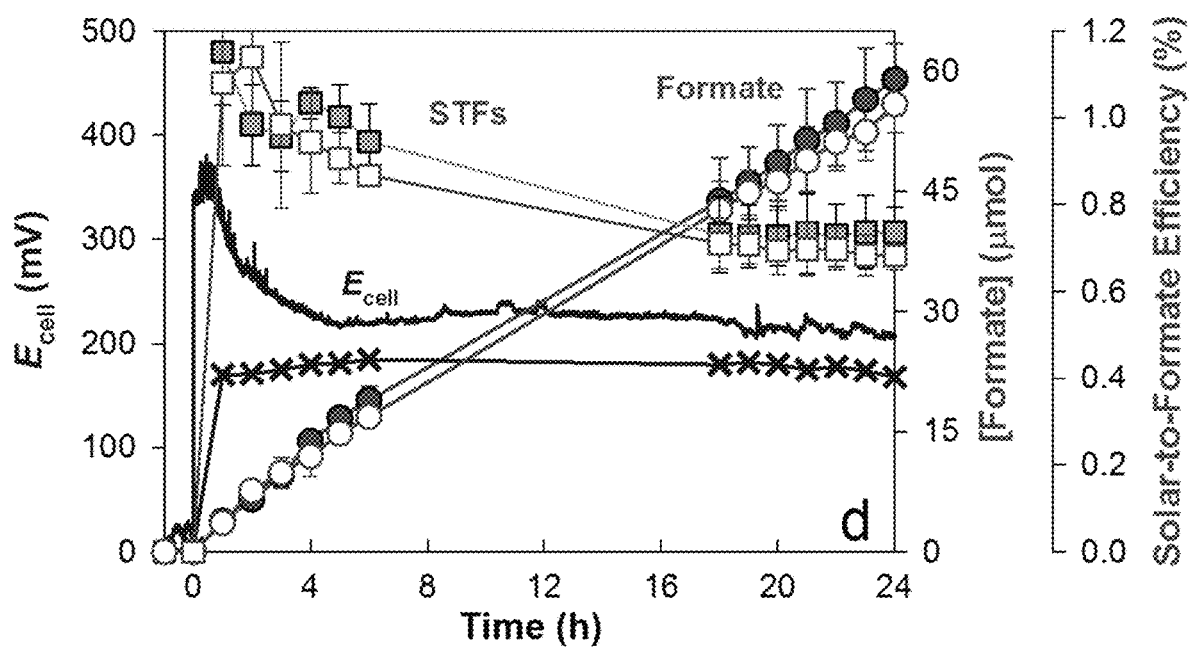

FIG. 3D shows the formate conversion efficiencies of the photoelectrochemical devices of Examples 3-2 and 4-2. For benchmark efficiency, a CuFeO$_2$/CuO electrode was directly wired to a Pt foil electrode in a single cell with a CO$_2$-purged bicarbonate electrolyte, and the cell potentials (E$_{cell}$) were recorded using a potentiostat (PEC-3) or a multimeter (PEC-4) while the produced formate was intermittently quantified. Upon irradiation, E$_{cell}$ increased from 10 mV to 350 mV and stabilized at 220 mV in 5 h, while formate was continuously produced to 60 µmol in 24 h (2.5 µmol h$^{-1}$). Similar results were yielded in the devices of Example 4. With the two-electrode device of Example 3 or 4, the solar-to-formate (STF) efficiency was 1-1.2% for the initial period of 5 h and then stabilized to 0.7% for the following hours. This efficiency is approximately eight-fold higher than that reported previously. These results demonstrate that CuFeO$_2$/CuO can be fabricated by a simple process and can convert CO$_2$ to formate when directly irradiated with solar light without the application of external power. The solar-to-formate (STF) efficiency was calculated using the following equation:

$$\text{STF efficiency}(\%) = \frac{\text{Formate(mol)} \times \Delta G\ °(\text{kj} \cdot \text{mol}^{-1})}{P_{total}(\text{mW} \cdot \text{cm}^{-2}) \times \text{Electrode area}(\text{cm}^2)}$$

Figure 3E:
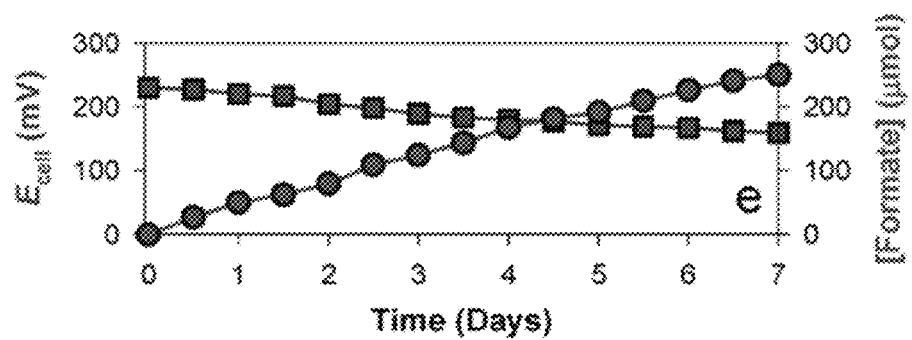

FIG. 3E shows the lifetime of the photoelectrochemical device of Example 4-2. Formate production continued for over 1 week and reached ~250 µmol on day 7, while E$_{cell}$ gradually decreased from −230 mV to −170 mV. The electrolyte was analyzed using ICP-MS after the long-term test; however, neither Fe nor Cu ions were found. However, the partial reductions of Cu(II) to Cu(I) as well as Fe(III) to Fe(II) were observed. The decrease in the formate production rate and E$_{cell}$ was attributed to the oxidation of the accumulated formate at the Pt electrode. The linear formate production for over 7 days can lead to the conclusion that the formate can be stably and continuously produced for a long time.

Figure 6:
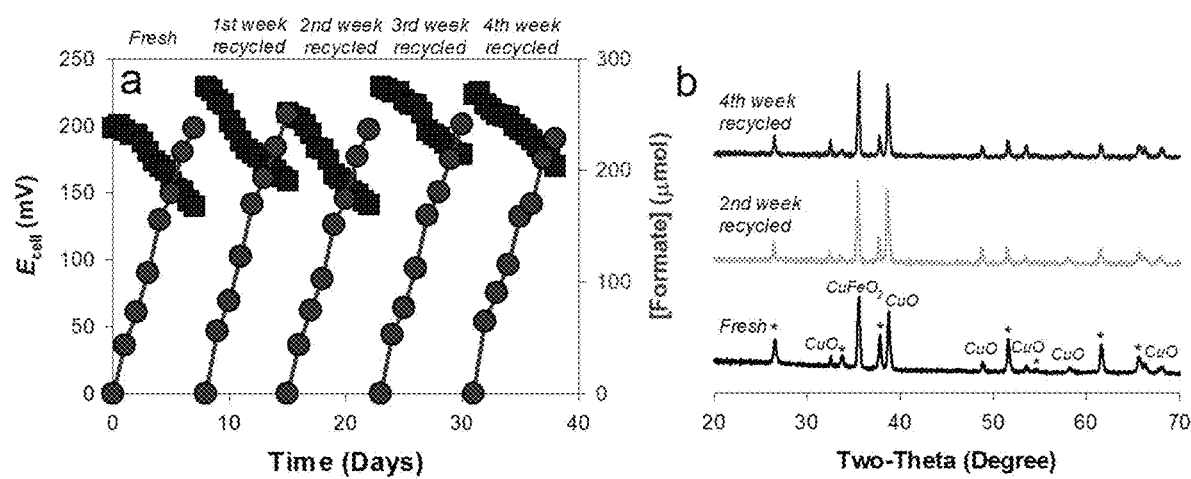
FIG. 6 shows the lifetime of a device fabricated in Example 4-2.

For the reuse of the electrode of the photoelectrochemical device of Example 4-2, the durability of the electrode was further improved using a thermal recycling process. The thermal recycling process was carried out by annealing in an electric furnace at 650° C. for 3 h under atmospheric air. The lifetime and durability of the electrode of the photoelectrochemical device of Example 4-2 were measured after annealing through the thermal recycling process. The results are shown in FIG. 6. (a) of FIG. 6 shows the lifetime of the photoelectrochemical device of Example 4-2 reused after annealing of the electrode of the device. (b) of FIG. 6 shows XRD patterns of the catalyst included in the photoelectrochemical device reused after annealing of the electrode of the device.

Formate was produced using the photoelectrochemical device of Example 4-2 reused after annealing of the electrode of the device. Referring to (a) of FIG. 6, formate production reached ~250 µmol on day 7 of the first cycle of the photoelectrochemical device and $E_{cell}$ gradually decreased from ~230 mV to ~170 mV. After the first cycle (at the first week), the device was annealed for reuse. On day 7 of the second cycle (day 14), formate production reached ~260 µmol and $E_{cell}$ gradually decreased from ~240 mV to ~150 mV. After the second cycle (at the second week), the device was annealed for reuse. On day 7 of the third cycle (day 21), formate production reached ~245 µmol and $E_{cell}$ gradually decreased from ~210 mV to ~140 mV. After the third cycle (at the third week), the device was annealed for reuse. On day 7 of the fourth cycle (day 28), formate production reached ~250 µmol and $E_{cell}$ gradually decreased from ~230 mV to ~170 mV. After the fourth cycle (at the fourth week), the device was annealed for reuse. On day 7 of the fifth cycle (day 35), formate production reached ~240 µmol and $E_{cell}$ gradually decreased from ~220 mV to ~160 mV. In conclusion, the inventive photoelectrochemical device can be reused at least 5 times consecutively. The above results can conclude that the inventive photoelectrochemical device can be reused for over 35 consecutive days by recycling while maintaining its high performance.

(b) of FIG. 6 shows XRD patterns of the catalyst used in the photoelectrochemical device of Example 4-2 measured after driving for over 4 weeks. Referring to (b) of FIG. 6, no structural changes were observed during thermal recycling and no changes were found during reduction. These results demonstrate that the catalyst can be consecutively used for a long time without deterioration of its performance resulting from structural changes.

The continuous formate production for over 35 days indicates that the photoelectrochemical device can be used for over consecutive 35 days. In conclusion, the device has long lifetime and increased durability and can stably and continuously produce formate. The high STF efficiency with high durability for over 35 days was not previously reported. The electrode can be fabricated in a simple process using earth-abundant photoelectrical elements (Cu and Fe) and is very promising for use in $CO_2$ conversion.

3. Faradaic Efficiency and Oxygen Production

Figure 7:
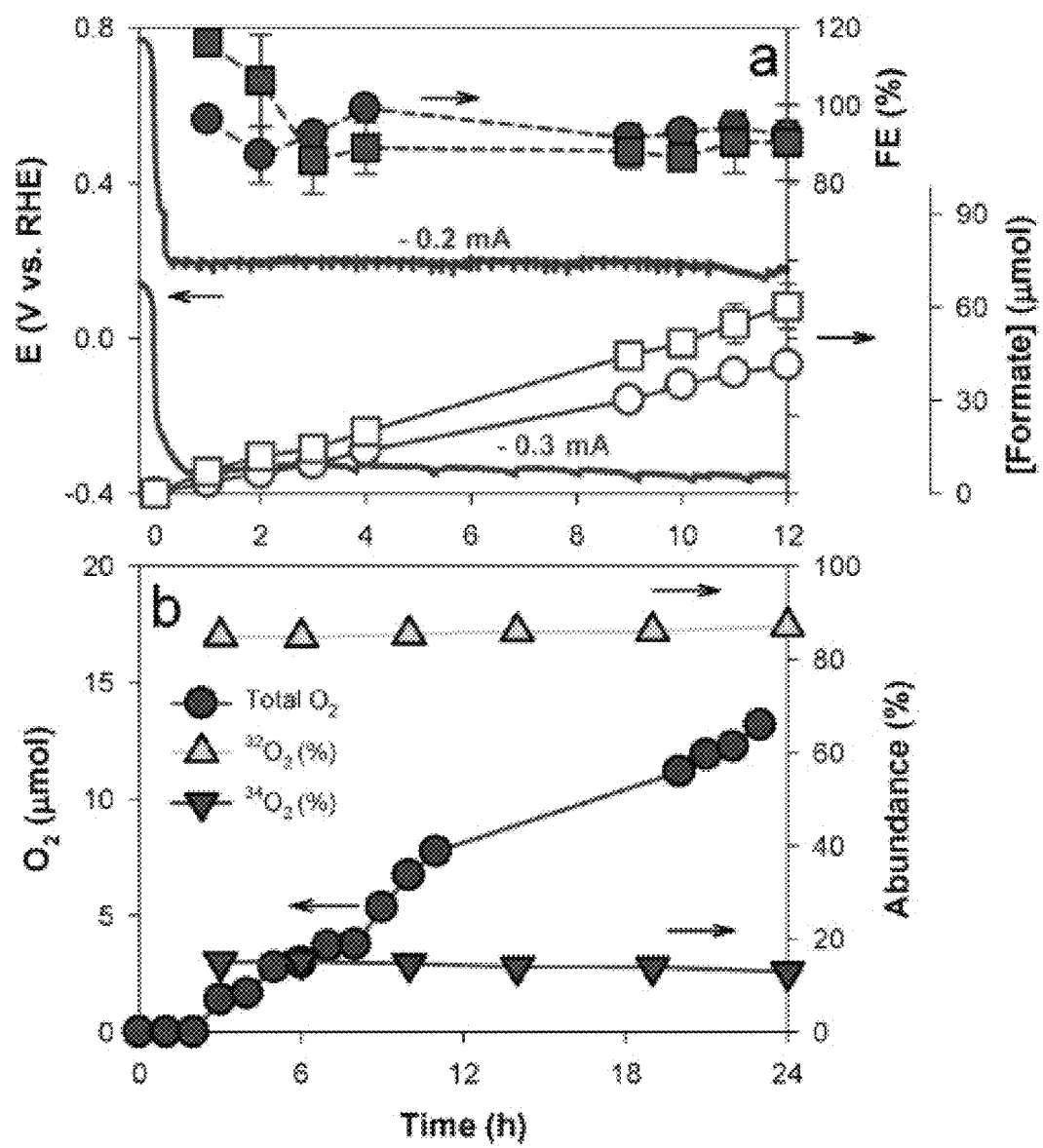
FIG. 7 shows the faradaic efficiencies of $CuFeO_2$/CuO electrodes and the amounts of oxygen evolved from a device fabricated in Example 4-2.

FIG. 7 shows the faradaic efficiencies of the $CuFeO_2/CuO$ electrodes and the amounts of oxygen evolved from the device of Example 4-2. The faradaic efficiency was estimated by the application of constant cathodic current (−0.2 and −0.3 mA) to each $CuFeO_2/CuO$ electrode. In the dark, no measurable amount of formate was produced, whereas, upon irradiation, formate was linearly produced for over 12 h. The faradaic efficiencies were maintained at over 90%. The formate production was measured under constant potentials of +0.2 and −0.35 $V_{RHE}$. Faradaic efficiencies for formate production were calculated using the following equation:

$$\text{Faradaic efficiency}(\%) = \frac{\text{Formate}(\text{mol})}{I(A) \times 1/96{,}485 \ C^{-1} \cdot \text{mol} \times \text{Time}(s)} \times 2 \times 100\%.$$

(b) of FIG. 7 shows the evolution of oxygen when using the device of Example 4-2. Oxygen production was linear with irradiation time. Formate was produced through the conversion of carbon dioxide induced by electrons on the $CuFeO_2/CuO$ surface and oxygen was produced on a Pt foil as the counter electrode by water oxidation. Since oxygen entering from the outside may appear to be produced, oxygen production was confirmed using isotope tests. For the measurement of oxygen isotopes, selective ion-monitoring (SIM) GC-MS (Agilent 7890 and MSD-5975C) was used to analyze $O_2$ and $^{18}O$-labelled $H_2O$ ($^{32}O_2$, $^{34}O_2$, and $^{36}O_2$). The $O_2$-leaking test was repeated several times and the observed oxygen amounts were confirmed to be reliable.

Figure 8:
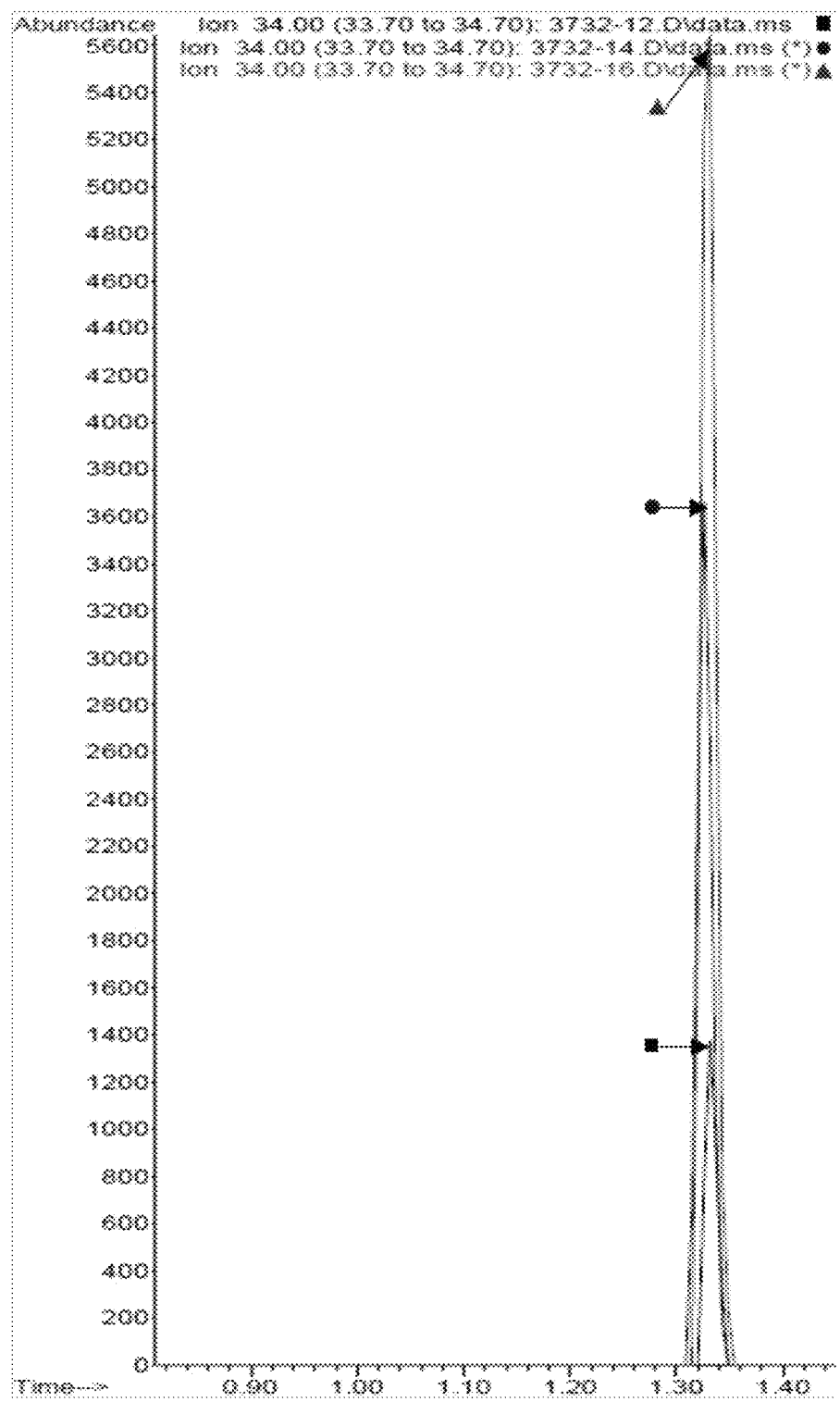
FIG. 8 shows GC-MS spectra for oxygen evolved from devices fabricated in Example 4-2.

FIG. 8 shows GC-MS spectra for oxygen produced from the device of Example 4-2.

Referring to FIG. 8, the use of $^{18}O$-labelled $H_2O$ (20%) in aqueous bicarbonate solution further showed that 15-18% of the total headspace $O_2$ amount is $^{34}O_2$, verifying that $O_2$ is truly produced via the oxidation of water. After $^{18}O$-labelled $H_2O$ was mixed with $^{16}O$-labelled $H_2O$ in a ratio of 20:80, oxygen production was measured. As a result, the ratio $^{32}O_2$:$^{34}O_2$ was 80:20, verifying the production of oxygen from via the oxidation of water.

Figure 9:
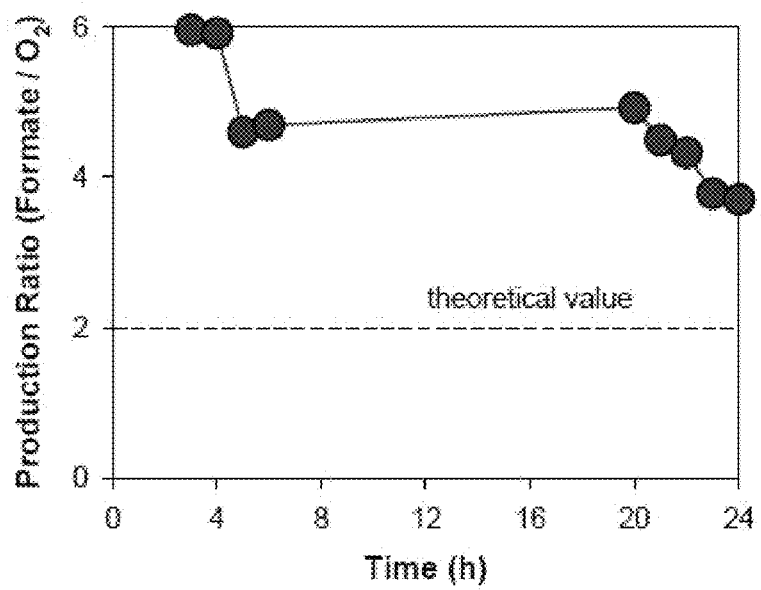
FIG. 9 shows the production ratios of formate and oxygen in a device fabricated in Example 4-2.

FIG. 9 shows the production ratios of formate and oxygen in the device of Example 4-2.

Referring to FIG. 9, the production ratios of formate and oxygen were higher than the theoretical value of 2 because the cathodic and anodic reactions occurred non-stoichiometrically. The stoichiometric ratio of formate and oxygen is 2, as shown in dashed lines, but oxygen was produced in an amount smaller than the stoichiometric ratio. This non-stoichiometry might be attributed to the sluggish water oxidation. Oxygen production requires holes but the oxidation of a slight amount of formate appears to lead to a reduction in water oxidation rate. This explains the higher production ratio of formate and oxygen than the theoretical ratio.

4. NMR (Formate Production)

NMR spectra were recorded to confirm the production of formate from the device of Example 4-2. The results are shown in FIGS. 10A-10C.

Figure 10A:
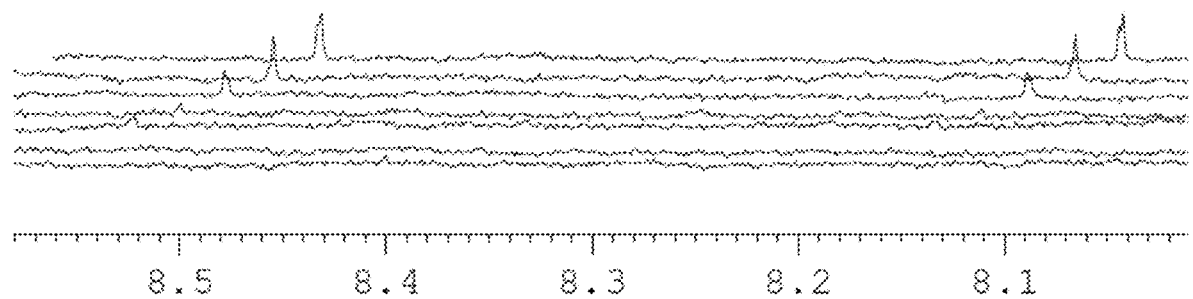
FIGS. 10A-10C show NMR spectra for a device fabricated in Example 4-2.

FIG. 10A is a $^1H$-NMR spectrum. To identify the carbon in formate, a wired couple of $CuFeO_2/CuO$ and Pt foil was immersed in $^{12}C$-bicarbonate solution through which $^{13}CO_2$ gas was purged. Upon irradiation, doublet $^1H$-NMR shifts at ~8.57 and ~8.18 ppm ($^1J_{CH}$=195 Hz) that are associated with the $^{13}C$-formate gradually increased.

Figure 10B:
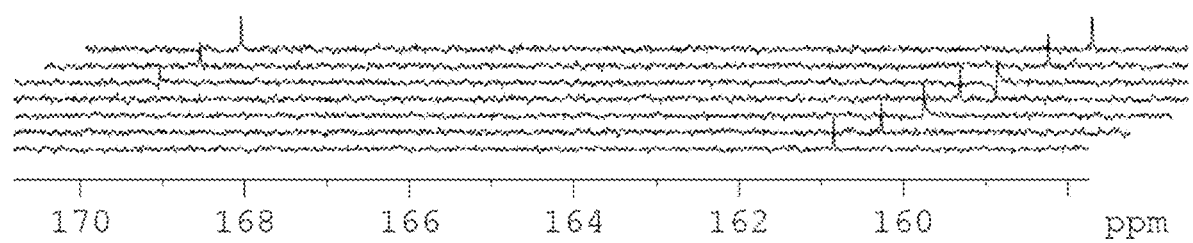

In the $^{13}C$-NMR spectrum shown in FIG. 10B, two peaks at 171 and 160.8 ppm were observed that were associated with the presence of $^{13}C$-formate and $^{13}C$-bicarbonate, respectively. These peaks reveal the production of formate.

Figure 10C:
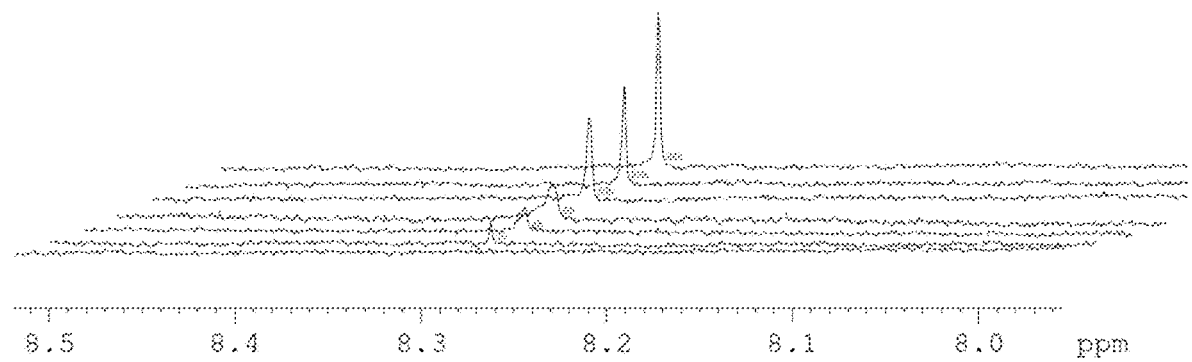

FIG. 10C is a $^1H$-NMR spectrum. When $^{12}CO_2$ was purged through $^{13}C$-bicarbonate solution, $^1H$-NMR shifts at 8.26 ppm corresponding to $^{12}C$-formate increased linearly. These NMR studies, therefore, verify that the purged carbon dioxide is converted to formate.

5. Incident Photon-to-current Efficiency (IPCE)

Figure 11:
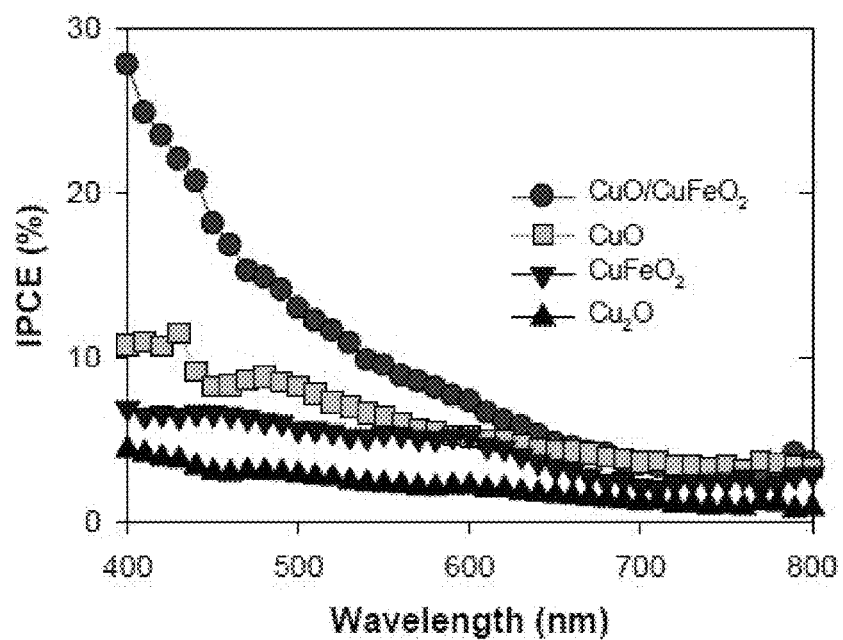
FIG. 11 shows the IPCEs of devices fabricated in Example 2.

FIG. 11 shows the IPCEs of the devices of Example 2.

Incident photon-to-current efficiency (IPCE) measurement further indicated that the charge separation efficiency is enhanced by the creation of the heterojunction structure. CuO exhibited an IPCE of 3-10% in the wavelength range between 400 and 800 nm, whereas the IPCEs of $CuFeO_2$ and $Cu_2O$ were smaller than 6 and 4%, respectively, in the same wavelength range. However, the IPCE value of $CuFeO_2$/CuO was 28% at 400 nm and significantly higher in the long wavelength range. IPCE was calculated by equation: IPCE= $(1240 \times I_{ph}) \times 100/(P_{light} \times \lambda)$.

As is apparent from the foregoing, the photoelectrochemical electrode including the p-type copper-iron composite oxide and the photoelectrochemical device including the photoelectrochemical electrode according to the present invention can convert carbon dioxide to formate using photocurrents generated upon irradiation. The photoelectrochemical electrode converts carbon dioxide to formate with a selectivity of 95% and a conversion efficiency as high as 1.2%. The photoelectrochemical device enables linear production of formate for over 1 week, confirming its long lifetime and ability to produce formate stably and continuously. The p-type copper-iron composite oxide can be fabricated at a reduced cost in a simple process and is a useful material that can reduce carbon dioxide emission and produce the particular organic substance.

What is claimed is:

1. A photoelectrochemical electrode comprising a conducting substrate and $CuFeO_2$/CuO as a copper-iron composite oxide electrodeposited on the conducting substrate wherein upon irradiation, the photoelectrochemical electrode generates electrons and converts carbon dioxide to formate with a selectivity of 90 to 99%,
    wherein the electrodeposited $CuFeO_2$/CuO composite oxide has a double-layered structure and the $CuFeO_2$ is present in a bottom layer and the CuO is present in a top layer, and
    wherein the substrate is in direct contact with the bottom layer comprising $CuFeO_2$ on one side of the bottom layer which is opposite to the top layer comprising CuO, and wherein the substrate and the top layer are not in direct contact with each other.

2. The photoelectrochemical electrode according to claim 1, wherein the conducting substrate comprises a glass or plastic substrate containing a material selected from the group consisting of polypropylene (PP), polyimide (PI), polyethylene terephthalate (PET), polyethylene naphthalate (PEN), polycarbonate (PC), triacetyl cellulose (TAC), indium tin oxide (ITO), fluorine tin oxide (FTO), antimony tin oxide (ATO), zinc oxide (ZnO), tin oxide ($SnO_2$), ZnO—$Ga_2O_3$, ZnO—$Al_2O_3$, $SnO_2$—$Sb_2O_3$, Ti, Pt, Au, Ag, Ni, and combinations thereof.

3. The photoelectrochemical electrode according to claim 1, wherein the carbon dioxide-to-formate conversion efficiency is from 1 to 1.5%.

4. The photoelectrochemical electrode according to claim 1, wherein the copper-iron composite oxide $CuFeO_2$/CuO is p-type and is electrodeposited for 30 minutes to 2 hours and the electrodeposited film is sintered at 620 to 720° C. for 1 to 3 hours.

5. The photoelectrochemical electrode according to claim 1, wherein the photoelectrochemical electrode is reused by annealing.

6. The photoelectrochemical electrode according to claim 1, wherein the double-layered structure of the $CuFeO_2$/CuO composite oxide is a bicrystalline structure.

7. A photoelectrochemical device for carbon dioxide conversion comprising the photoelectrochemical electrode according to claim 1, a counter electrode, an electrolyte solution, and a housing adapted to accommodate the photoelectrochemical electrode, the counter electrode, and the electrolyte solution wherein the photoelectrochemical electrode is electrically connected to the counter electrode.

8. The photoelectrochemical device according to claim 7, wherein the electrolyte is a sodium bicarbonate or potassium bicarbonate solution purged with a gas selected from nitrogen, carbon dioxide, and oxygen.

9. The photoelectrochemical device according to claim 7, wherein the photoelectrochemical device has a lifetime of at least 35 days.

10. The photoelectrochemical device according to claim 7, wherein the photoelectrochemical electrode is made reusable and durable by annealing.

11. A photoelectrochemical device for carbon dioxide conversion comprising the photoelectrochemical electrode according to claim 2, a counter electrode, an electrolyte solution, and a housing adapted to accommodate the photoelectrochemical electrode, the counter electrode, and the electrolyte solution wherein the photoelectrochemical electrode is electrically connected to the counter electrode.

12. A photoelectrochemical device for carbon dioxide conversion comprising the photoelectrochemical electrode according to claim 3, a counter electrode, an electrolyte solution, and a housing adapted to accommodate the photoelectrochemical electrode, the counter electrode, and the electrolyte solution wherein the photoelectrochemical electrode is electrically connected to the counter electrode.

13. A photoelectrochemical device for carbon dioxide conversion comprising the photoelectrochemical electrode according to claim 4, a counter electrode, an electrolyte solution, and a housing adapted to accommodate the photoelectrochemical electrode, the counter electrode, and the electrolyte solution wherein the photoelectrochemical electrode is electrically connected to the counter electrode.

14. A photoelectrochemical device for carbon dioxide conversion comprising the photoelectrochemical electrode according to claim 5, a counter electrode, an electrolyte solution, and a housing adapted to accommodate the photoelectrochemical electrode, the counter electrode, and the electrolyte solution wherein the photoelectrochemical electrode is electrically connected to the counter electrode.

* * * * *